United States Patent [19]

Zuckerberg et al.

[11] Patent Number: 5,047,196
[45] Date of Patent: Sep. 10, 1991

[54] METHOD FOR FORMING CO-EXTRUDED ADHESIVE TAPES

[75] Inventors: Leo Zuckerberg; Enrique Torres, both of Houston, Tex.

[73] Assignee: Tek-Rap, Inc., Tex.

[21] Appl. No.: 347,930

[22] Filed: Jun. 29, 1989

[51] Int. Cl.$^5$ .......................................... B29C 47/06
[52] U.S. Cl. .............................. 264/171; 156/244.11; 264/211; 264/211.12; 425/131.1; 425/133.5
[58] Field of Search ................... 264/171, 211, 211.12; 425/131.1, 133.5, 462; 156/244.11

[56] References Cited

U.S. PATENT DOCUMENTS

| | | | |
|---|---|---|---|
| 2,708,289 | 5/1955 | Collings | 264/171 |
| 3,611,492 | 10/1971 | Scheibling | 425/462 |
| 3,639,573 | 2/1972 | Port | 264/171 |
| 3,694,119 | 9/1972 | Scheibling | 425/133.5 |
| 3,871,947 | 3/1975 | Brekken | 264/171 |
| 4,379,806 | 4/1983 | Korpman | 264/171 |
| 4,425,176 | 1/1984 | Shibano et al. | 156/244.11 |
| 4,430,135 | 2/1984 | Schmukler et al. | 156/244.11 |

FOREIGN PATENT DOCUMENTS 2020621 11/1971 Fed. Rep. of Germany ... 425/133.5

Primary Examiner—Jeffery Thurlow
Attorney, Agent, or Firm—Salter & Michaelson

[57] ABSTRACT

A method and apparatus for forming intimately fused, multiple layer co-extruded adhesive tapes. The apparatus includes a co-extrusion die having an outlet aperture therein of elongated width and reduced height and first, second and third interior extrusion channels which merge in the interior of the die to form a common outlet channel which passes outwardly through the outlet aperture. The apparatus is operative in accordance with the method by feeding a first pressurized stream comprising a molten elastomeric based adhesive polymer to the first extrusion channel, a second pressurized stream comprising a molten flexible thermoplastic polymer and an elastomerically compatible coupling agent to the second extrusion channel and a third pressurized stream comprising either a molten flexible thermoplastic polymer or a molten elastomeric based adhesive polymer to the third extrusion channel. When the apparatus is operated in this manner the three molten pressurized streams merge in the interior of the die and pass outwardly through the outlet aperture as a thin partially stratified sheet comprising three intimately fused layers.

15 Claims, 2 Drawing Sheets

METHOD FOR FORMING CO-EXTRUDED ADHESIVE TAPES

BACKGROUND AND SUMMARY OF THE INVENTION

The instant invention relates to adhesive tapes and more particularly to a method and apparatus for making co-extruded adhesive tapes.

Adhesive tapes made of protective thermoplastic materials have generally been found to be effective for applications, such as protecting above ground, underground and marine pipes against corrosion. Specifically, it has been found that above ground, underground and marine pipes can generally be effectively protected against corrosion by spirally wrapping the exterior surfaces thereof with adhesive tapes in a manner wherein adjacent spiral wrappings overlap each other slightly. Generally it has been found that tapes comprising durable thermoplastic layers made from materials, such as polyethylene and adhesive layers made from elastomeric based adhesives can be effectively utilized for applications of this type. Further, it has generally been found that in many instances it can be advantageous to apply two layers of tapes of this type to pipes in order to provide increased protection against moisture induced corrosion. Nevertheless, it has been found that in some instances moisture can even penetrate through two layers of protective tapes by penetrating the overlapping seam areas of adjacent spiral wrappings. However, recently it has been found that moisture penetration through the overlapping seam areas of protective tape layers can be further reduced by utilizing first or inner tape layers having adhesives on both surfaces thereof and outer tape layers having adhesives on only the inner surfaces thereof. In this regard, it has been found that by utilizing inner tape layers having adhesives on both surfaces thereof, the inner tape layers can more effectively bond to themselves in the overlapping seam areas of adjacent tape sections and the outer tape layers can more effectively bond to the inner tape layers along the entire extents of pipe sections.

Heretofore most conventional tapes for wrapping pipe sections have been manufactured in calendaring processes wherein adhesive layers made from elastomeric based adhesive materials are pressed onto base layers made from thermoplastic materials. However, while tapes of this type have generally been found to be effective for many applications, it has been found that when they are exposed to severe temperature conditions, such as temperatures below $-40°$ F., they tend to delaminate and therefore lose there overall effectiveness.

While most of the heretofore available tapes for wrapping underground pipe sections have been manufactured in calendaring lamination processes, some of the heretofore available tapes have been manufactured in extrusion processes wherein molten thermoplastic streams are merged with molten elastomeric adhesive streams in extrusion dies to form tapes comprising two layers which are more intimately bonded together. However, it has been found that even tapes of this type can become delaminated when they are exposed to extreme temperature conditions due to the generally incompatible nature of elastomeric based adhesives and thermoplastic materials. Further, while attempts have been made to overcome this problem by merging thermoplastic streams and streams comprising thermoplastic-coupling agent blends before they are passed into extrusion dies and then merging the partially stratified combined streams with elastomeric based adhesive streams in extrusion dies, tapes made by this process have been found to be of inconsistent quality, although they have generally been found to be more effective than other types of tapes from a standpoint of resisting delamination.

The instant invention provides an effective method and apparatus for forming an co-extruded adhesive tape which is of consistent quality and highly resistant to delamination under even the most extreme temperature conditions. Specifically, the apparatus of the instant invention comprises a co-extrusion die having an elongated outlet aperture therein and first, second and third extrusion channels which extend from first, second and third inlet openings toward the outlet aperture and merge in the interior of the die to form an outlet channel which opens outwardly through the outlet aperture. The apparatus further includes means for supplying a first pressurized stream comprising an elastomeric base adhesive polymer to the first inlet opening and means for supplying a second pressurized stream comprising a uniformly dispersed blend of a molten flexible thermoplastic and a molten elastomerically compatible coupling agent to the second inlet opening. The apparatus still further includes means for supplying a third pressurized stream comprising either a molten elastomeric based polymer or a molten flexible thermoplastic to the third inlet opening and the preferred embodiment of the apparatus still further includes cooling roller means for cooling the extruded stream after it has passed outwardly from the outlet aperture. The outlet aperture is of elongated dimension in an X direction and reduced dimension in a Y direction which is perpendicular to the X direction. The outlet aperture preferably has a dimension of at least approximately 1 inch in the X direction and a dimension of between approximately 15 mils and 60 mils in the Y direction. Further, the first, second and third channels in the co-extrusion die are preferably of elongated dimension in the X direction and of reduced dimension in the Y direction in the area where the extrusion channels merge. Specifically, the first, second and third channels are preferably of substantially the same dimension in the X direction as the outlet aperture in the area where they merge in the interior of the die.

It has been found that the above described apparatus can be effectively utilized in accordance with the method of the subject invention for forming a continuous sheet of consistently high quality adhesive tape which is highly resistant to delamination. Specifically, the method of the subject invention comprises the steps of continuously and simultaneously passing first, second and third uniformly dispersed molten streams through a co-extrusion die of the above described type. The first stream comprises between approximately 20% and 60% by weight of an elastomeric based adhesive polymer, between approximately 0% and 55% (preferably at least 20%) by weight of fillers, between approximately 8% and 40% by weight of tackifiers, between approximately 0% and 6% (preferably at least 3%) by weight processing aids, between approximately 0% and 60% (preferably at least 15%) by weight of reinforcing materials and between approximately 0% and 15% (preferably at least 2%) by weight of protective materials. The second pressurized stream comprises between approximately 25% and 90% by weight of a flexible thermoplastic and between approximately 5% and 80% by weight of elastomerically compatible coupling agent. The third pressurized stream comprises either between approximately 80% and 100% by weight of a molten flexible thermoplastic or a mixture comprising between approximately 20% and 60% of an elastomeric based adhesive polymer, between approximately 0% and 55% (preferably at least 20%) by weight of fillers, between approximately 8% and 40% by weight of tackifiers, between approximately 0% and 6% (preferably at least 3%) by weight of processing aids, between approximately 0% and 60% (preferably at least 15%) by weight of reinforcing materials, between approximately 0% and 15% (preferably at least 2%) by weight of protective materials. In accordance with the method the first, second and third streams are fed to a co-extrusion die of the above described type so that they pass through the first, second and third extrusion channels respectively, and merge in the outlet channel before passing outwardly through the outlet aperture. The first, second and third channels are oriented so that the material from the second stream is interposed between the material from the first and third streams as the first, second and third streams merge. The first, second and third streams are merged in the die so that they pass outwardly through the outlet aperture as a continuous sheet comprising first, second and third intimately fused layers of material from the first, second and third streams, respectively. The thermoplastic material in the second stream preferably comprises polyethylene and when the third stream includes a thermoplastic material the thermoplastic material in the third stream preferably also comprises polyethylene. The elastomeric based adhesive polymer preferably comprises an adhesive polymer selected from a group consisting of EPDM, EPM or butyl elastomeric based adhesive polymers and the coupling agent in the second stream preferably comprises a coupling agent selected from a group consisting of EPDM, EPM or butyl coupling agents. Further the first, second and third streams are preferably heated to a temperature of at least approximately 300° F. before they merge in the co-extrusion die.

It has been found that the method and apparatus of the subject invention can be effectively utilized for producing high quality tapes having adhesive layers on either one or both sides thereof. In this regard, when the third pressurized stream comprises a molten flexible thermoplastic material the tape is formed so that it has adhesive on only one side thereof, (the side which is defined by material from the first stream). In this case, the second stream provides an intermediate bonding layer which effectively bonds the material from the first stream to the material from the third stream as the three streams are coextruded. The second stream preferably comprises a blend of material from the first and third streams and it is blended so that it is substantially more compatible with both the first and third streams than the first and third streams are with each other. Accordingly, the second stream is able to effectively bond to both the first and third streams. On the other hand, when the third stream comprises an elastomeric based adhesive polymer, the second stream not only functions as a bonding layer between the material from the first and third streams but it also functions as a base or strength layer which provides the necessary level of strength and durability in the tape. In this regard, because the second stream comprises a blend of a flexible thermoplastic and a coupling agent it is able to effectively bond to the first and third elastomeric streams while nevertheless providing the desired level of strength in tapes made in accordance with the method of the instant invention.

Accordingly, it is a primary object of the instant invention to provide an effective method of making a co-extruded adhesive tape which is of consistently high quality and highly resistant to delamination.

Another object of the instant invention is to provide an effective method of forming an adhesive tape by merging lo material from first, second and third molten streams in a three channel extrusion die.

Another object of the instant invention is to provide an effective apparatus for forming an adhesive tape comprising a three channel co-extrusion die.

An even still further object of the instant invention is to provide an effective apparatus for forming a co-extruded adhesive tape which is highly resistent to delamination.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
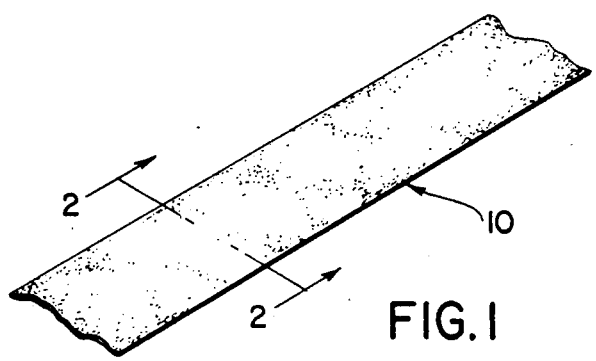
FIG. 1 is a perspective view of one form of tape made by the method of the instant invention.
Figure 2:
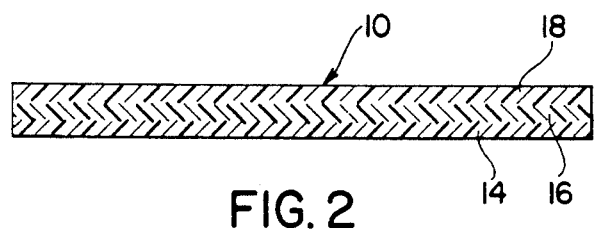
FIG. 2 is a sectional view thereof taken along line 2—2 in FIG. 1.
Figure 3:
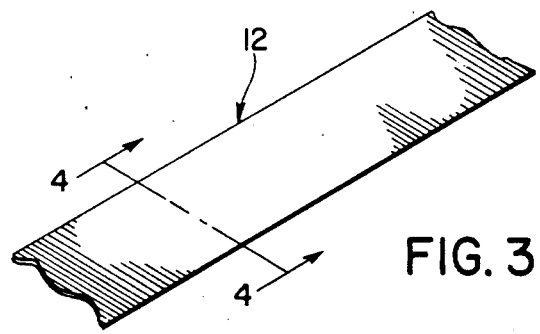
FIG. 3 is a perspective view of a second form of tape made by the method of the instant invention.
Figure 4:
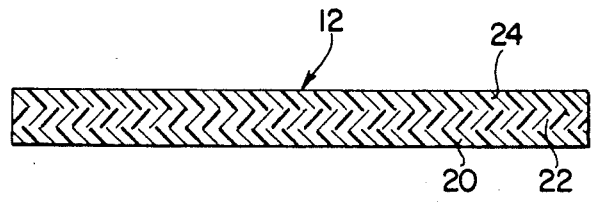
FIG. 4 is a sectional view thereof taken along line 4—4 in FIG. 3.

Referring first to FIGS. 1-4, a first form of tape made by the method and apparatus of the instant invention is illustrated and generally indicated at 10 in FIGS. 1 and 2 and a second form of tape made by the method and apparatus is illustrated and generally indicated at 12 in FIGS. 3 and 4. The tape 10 comprises first, second and third layers 14, 16, 18, respectively and it is constructed so that both of the first and third layers 14 and 18, respectively, are tacky adhesive layers and so that the second or center layer 16 is a base or strength layer which is interposed between the adhesive first and third layers 14 and 18 respectively. The tape 12, on the other hand, comprises an elastomeric adhesive first layer 20, a second or center layer 22 and a non-adhesive third layer 24; and hence, the tape 12 is formed so that it has only one adhesive side.

Figure 5:
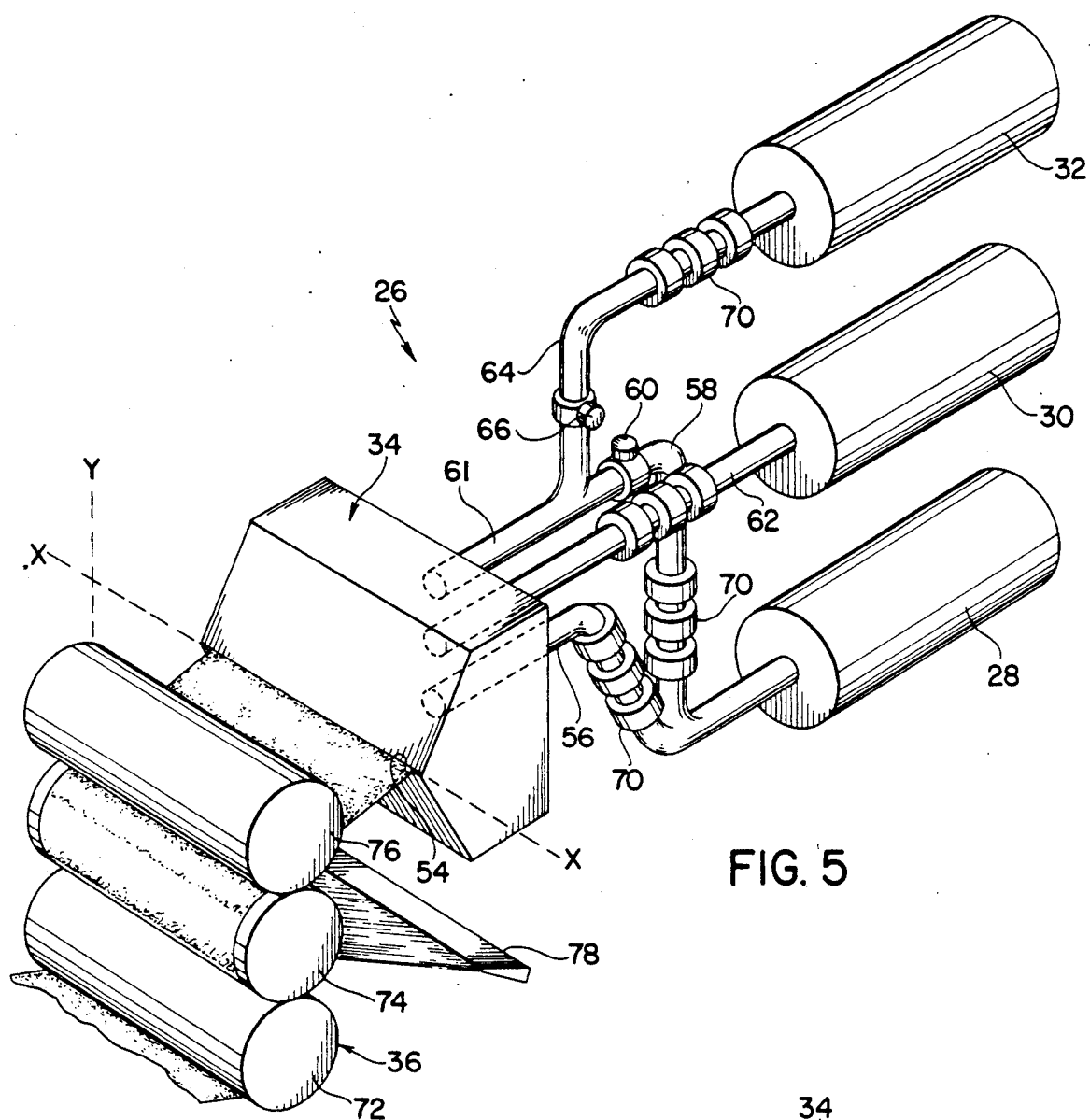
FIG. 5 is a perspective view of the apparatus of the instant invention.
Figure 6:
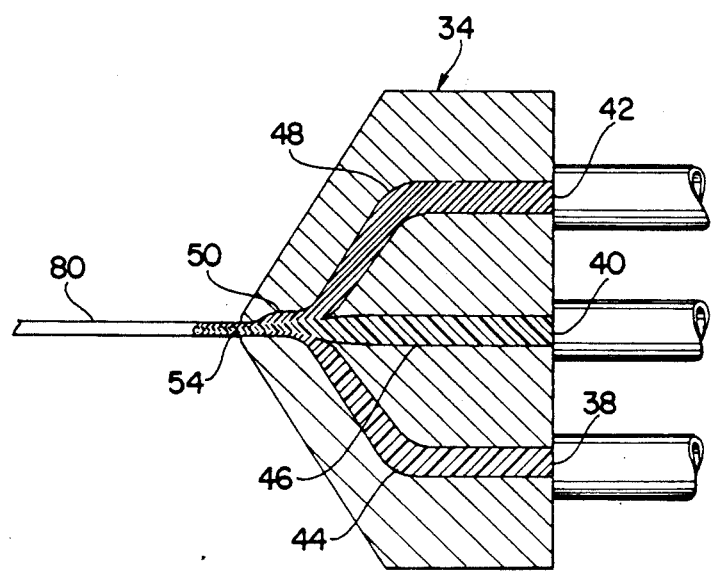
FIG. 6 is a sectional view of the co-extrusion die thereof.

Referring now to FIGS. 5 and 6, the apparatus of the instant invention is illustrated and generally indicated at 26 in FIG. 5. The apparatus 26 comprises first, second and third extruders 28, 30, 32, respectively, a co-extrusion die generally indicated at 34 and a cooling roller assembly generally indicated at 36. The co-extrusion die 34 includes first, second and third inlet openings 38, 40 and 42, respectively, and first, second and third extrusion channels 44, 46 and 48, respectively, which extend from the first, second and third inlet openings 38, 40, 42, respectively, to a combined outlet channel 50 which opens outwardly through an outlet aperture 54. As illustrated in FIG. 5, the outlet aperture 54 has an elongated dimension in an X direction but it has a reduced dimension in a Y direction which is perpendicular to the X direction. The outlet aperture 54 has a dimension of at least approximately 1 inch and preferably at least approximately 12 inches in the X direction and a dimension of between approximately 15 mils and 60 mils in the Y direction so that it can be effectively utilized for extruding a continuous thin sheet of tape. The first, second and third extrusion channels 44, 46, and 48 are formed so that the second extrusion channel 46 is interposed between the first and third channels 44 and 48, respectively, and so that they have substantially the same widths (dimensions in the X direction) as the outlet aperture 54 in the area where they merge to form the outlet channel 50. Accordingly, the first, second and third channels 44, 46 and 48 are operative for feeding material to the outlet channel 50 as three stratified layers which are at least slightly intermixed in the boundary areas therebetween. The first extruder 28 is connected to the first inlet opening 38 through a pipe section 56 and it is connected to the third inlet opening 42 through a pipe section 58 having a valve 60 therein and an inlet pipe section 61. The second extruder 30 is connected to the second inlet opening 40 through a pipe section 62 and the third extruder 32 is connected to the third inlet opening 42 through a pipe section 64 having a valve 66 therein and the inlet pipe section 61. In this regard, as illustrated, the pipe sections 58 and 64 merge into the inlet pipe section 61 downstream of the valves 60 and 66 so that material from either the first extruder 28 or the third extruder 32 can be fed to the die 34 by opening or closing the appropriate valves 60 and 66. A plurality of electric heater rings 70 surrounds each of the lines 56, 58, 62 and 64 from the extruders 28, 30, and 32 to maintain the materials passing therethrough at elevated temperature levels. The extruders 28, 30, and 32 are operative as conventional extruders for forcing pressurized streams of molten materials into the extrusion die 34. The cooling roller assembly 36 comprises a series of conventional first, second and third water cooled rollers 72, 74, and 76, respectively, and a water spray 78 which is operative for spraying water onto the second roller 74 to further cool the co-extruded sheet 80 from the die 34. After the sheet 80 has been cooled in this manner, it can be passed through a conventional slitting apparatus to longitudinally slit it into strips of tape 10 or 12 of a desired width.

In order to operate the apparatus 26 in accordance with the method of the subject invention to form a two sided adhesive tape 10 of the type illustrated in FIGS. 1 and 2, the first extruder 28 is charged with a molten first stream comprising between approximately 20% and 60% by weight of an elastomeric based adhesive polymer, between approximately 0% and 55% (preferably at least 20%) by weight of fillers, between approximately 8% and 40% by weight of tackifiers, between approximately 0% and 6% (preferably at least 3%) by weight of processing aids, between approximately 0% and 60% (preferably at least 15%) by weight of reinforcing materials and between approximately 0% and 15% (preferably at least 2%) by weight of protective materials. The second extruder 30 is charged with a stream comprising between approximately 25% and 90% by weight of a flexible thermoplastic and between approximately 5% and 80% by weight of an elastomerically compatible coupling agent. In order to manufacture a tape 10 of the type illustrated in FIGS. 1 and 2, the valve 60 is maintained in an open position whereas the valve 66 is maintained in a closed position and pressurized material is fed from the first extruder 28 into both the first inlet opening 38 and the third inlet opening 42. Pressurized material from the second extruder 30 is fed into the second inlet opening 40 which is interposed between the first and third inlet openings 38 and 42, respectively. The molten pressurized material from the first and second extruders 28 and 30 respectively, which is preferably maintained at a temperature of at least approximately 300° F. is charged to the co-extrusion die 34 so that it flows through the first, second and third extrusion channels 44, 46 and 48, respectively, and meets in the output channel 50 as three stratified layers which are at least partially intermixed in the boundary areas therebetween. The material from the output channel 50 then passes outwardly through the output aperture 54 as a partially stratified sheet 80 comprising three intimately fused or bonded layers which is then cooled with the cooling rollers 72, 74 and 76. The sheet 80 is then preferably longitudinally slit to form one or more tapes 10 of a predetermined width.

In the preferred form of the method of forming the tape 10 the elastomeric based adhesive polymer in the first stream which is charged to the first inlet opening 38 from the first extruder 28 comprises an elastomeric based adhesive polymer selected from a group consisting of EPDM, EPM or butyl elastomeric based adhesive polymers and the fillers in the first stream comprise one or more conventional fillers, such as clay, talc or calcium carbonate fillers. The tackifiers in the first stream preferably comprise one or more conventional tackifiers, such as hydrocarbon resins. For example, ESCOREZ (Exxon TM) manufactured by Exxon Corporation can be effectively utilized as a tackifier. The processing aids preferably comprise one or more conventional processing aids, such as mineral oils and/or sulphonates, liquid polymer processing aids, such as polybutylene, or aromatic oils. The reinforcing materials preferably comprise known reinforcing materials, such as carbon black based materials and the protective materials preferably comprise one or more conventional known protective materials, such as antioxidants, antiozonants and/or UV inhibitors. The flexible thermoplastic in the second stream preferably comprises polyethylene and the elastomerically compatible coupling agent preferably comprises the same elastomeric based adhesive polymer as in the first stream and more preferably it comprises the same blend of materials which are present in the first stream.

In order to operate the apparatus 26 to produce a tape, such as the tape 12 illustrated in FIGS. 3 and 4 which has an adhesive layer on only one side thereof, the apparatus 26 is operated with the valve 60 in a closed position and the valve 66 in an open position so that pressurized material from the third extruder 32 is charged to the third inlet opening 42 of the co-extrusion die 34. In this regard, the material from the third extruder 32 preferably comprises between approximately 80% and 100% by weight of molten polyethylene which is heated to a temperature of at least approximately 300° F. When the apparatus 26 is operated so that material from the third extruder 32 is charged to the co-extrusion die 34 through the third inlet opening 42, the materials from the o first, second and third extrusion channels 44, 46, and 48 meet in the outlet channel 50 to form a sheet 80 comprising three partially stratified layers. However, since the third stream which is fed to the third inlet opening 42 from the third extruder 32 comprises a flexible thermoplastic rather than an elastomeric based adhesive polymer, the sheet 80 has only a single adhesive surface. In any event after the sheet 80 has been cooled it is preferably longitudinally slit to form one or more tapes of a predetermined width.

EXAMPLE I

In a specific example of the method of the instant invention the apparatus of the instant invention was operated to produce a tape having adhesive of both sides thereof in accordance with the following process conditions: First Extruder 28 (first and third streams)

| First Extruder 28 (first and third streams) | |
|---|---|
| Temperature 320° F. | |
| Extruded Material Formulation | |
| Clay | 34% |
| Butyl Rubber | 20% |
| N-550 Black | 10% |
| PA-59-998 Tackifier | 10% |
| Wood Rosin | 10% |
| Plasticizer | 8% |
| Silica | 7% |
| Zinc Oxide | 1% |
| Second Extruder 30 (second stream) | |
| Temperature 400° F. | |
| Extruded Material Formulation | |
| High density polyethylene | 57% |
| Low density polyethylene | 20% |
| Carbon Black | 3% |
| Coupling Agent (equal mix of first and second streams) | 20% |

Third Extruder 32 (Not Operating)

Extrusion die temperature 410° F.
Extrusion die aperture size 0.025 inches × 80 inches
Tape size 0.020 inches × 80 inches
adhesive layers 0.005 inches thick each
center layer 0.010 inches thick A conventional release film was applied to the sheet of tape material manufactured in accordance with the above process conditions and the sheet with the release layer thereon was longitudinally slit into 18 inch wide tape strips which were rolled onto spools in a conventional manner. Upon visual inspection the tapes were found to be of consistently high quality and the three layers of the tapes were found to be intimately fused together.

EXAMPLE II

In a second specific application of the method of the instant invention the apparatus of the instant invention was operated in accordance with the following process conditions to produce a protective tape having an adhesive on only one side thereof.

| First Extruder 28 (first stream) | |
|---|---|
| Temperature 320° F. | |
| Extruded Material Formulation | |
| Clay | 34% |
| Butyl Rubber | 20% |
| N-550 Black | 10% |
| PA-59-998 Tackifier | 10% |
| Wood Rosin | 10% |
| Plasticizer | 8% |
| Silica | 7% |

| -continued | |
|---|---|
| Zinc Oxide | 1% |
| Second Extruder 30 (second stream) | |
| Temperature 400° F. | |
| Extruded Material Formulation | |
| High density polyethylene | 40% |
| Low density polyethylene | 37% |
| Carbon Black | 3% |
| Coupling Agent (equal mix of stream 1 with stream 3) | 20% |
| Third Extrusion 32 (third stream) | |
| Temperature 400° F. | |
| Extruded Material Formulation | |
| High density polyethylene | 55% |
| Low density polyethylene | 42% |
| Carbon Black | 3% |

Extrusion die temperature 410° F.
Extrusion die aperture size 0.025 inches × 80 inches
Tape size 0.025 inches × 80 inches
adhesive layer 0.012 inches
center layer 0.006 inches
thermoplastic layer 0.007 inches The single sided adhesive tape sheet manufactured in accordance with the above process conditions was longitudinally slit into 18 inch wide tape strips which were rolled onto spools in a conventional manner. Upon visual inspection the single sided adhesive tapes appeared to be of consistent quality and the three layers of the tapes were found to be intimately fused together.

In order to further test the tapes manufactured by examples I and II above, a sample of the two-sided tape manufactured in accordance with Example I was spirally wrapped on a 3 inch wide pipe section which had been previously coated with an adhesive primer. The tape was applied so that each spiral wrapping overlapped the edge portions of the preceding wrapping to form a continuous tape coating on the pipe section. Thereafter, a one-sided adhesive tape manufactured in accordance with Example II was overwrapped in a similar manner on the two-sided tape on the same pipe section. The pipe section was then tested for cathodic disbondment and adhesion in order to determine the effectiveness of the two layer tape covering thereon. It was found that the tape covering had superior cathodic disbondment properties when compared to conventional tape coverings and that the inner two-sided tape had substantially increased adhesion properties when compared to inner tape covering layers made from single sided adhesive tapes. The tapes made by Examples I and II were further tested for yield, elongation, and tensile strength and these properties were found to be comparable to conventional tapes.

It is seen therefore that the method and apparatus of the instant invention can be effectively utilized to produce high quality adhesive tapes for applications, such as for protecting underground pipes against corrosion. It has been found that the three layers of both the two-sided and the single-sided adhesive tapes manufactured with the inventive apparatus in accordance with the inventive method are intimately bonded as they are extruded in molten layers and because the center layers of the tapes include coupling agents, the thermoplastic and elastomeric materials in the tapes are effectively bonded together and resist delamination under even the most severe conditions. Accordingly, the apparatus and method of the instant invention represent significant advancements in the art relating to the manufacture of adhesive tapes.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of forming a continuous sheet of adhesive tape comprising the steps of continuously and simultaneously co-extruding first, second, and third pressurized substantially uniformly dispersed molten streams through a co-extrusion die, said first stream comprising between approximately 20% and 60% by weight of an elastomeric based adhesive polymer, between approximately 0% and 55% by weight of fillers, between approximately 8% and 40% by weight of tackifiers, between approximately 0% and 6% by weight of processing aids, between approximately 0% and 60% by weight of reinforcing materials and between approximately 0% and 15% by weight of protective materials, said second pressurized stream comprising between approximately 25% and 90% by weight of a flexible thermoplastic and between approximately 5% and 80% by weight of an elastomerically compatible coupling agent, said third pressurized stream comprising either between approximately 80% and 100% by weight of a molten flexible thermoplastic or a mixture comprising between approximately 20% and 60% by weight of an elastomeric based adhesive polymer, between approximately 0% and 55% by weight of fillers, between approximately 8% and 40% by weight of tackifiers, between approximately 0% and 6% by weight of processing aids, between approximately 0% and 60% by weight of reinforcing materials and between approximately 0% and 15% by weight of protective materials, the compatibility of said coupling agent with both said thermoplastic and said adhesive polymer being greater than the compatibility of said thermoplastic with said adhesive polymer, material from said first, second and third streams merging in the interior of said die so that the material from said second stream is interposed between the material from said first and third streams, material from said first, second and third streams passing outwardly from said co-extrusion die as a continuous tape sheet of first, second and third intimately fused layers of material from said first, second and third streams, respectively.

2. A method of forming a continuous sheet of adhesive tape comprising the steps of continuously and simultaneously co-extruding first, second, and third pressurized substantially uniformly dispersed molten streams through a co-extrusion die, said first stream comprising between approximately 20% and 60% by weight of an elastomeric based adhesive polymer, between approximately 0% and 55% by weight of fillers, between approximately 8% and 40% by weight of tackifiers, between approximately 0% and 6% by weight of processing aids, between approximately 0% and 60% by weight of reinforcing materials and between approximately 0% and 15% by weight of protective materials, said second pressurized stream comprising between approximately 25% and 90% by weight of a flexible thermoplastic and between approximately 5% and 80% by weight of an elastomerically compatible coupling agent, said third pressurized stream comprising either between approximately 80% and 100% by weight of a molten flexible thermoplastic or a mixture comprising between approximately 20% and 60% by weight of an elastomeric based adhesive polymer, between approximately 0% and 55% by weight of fillers, between approximately 8% and 40% by weight of tackifiers, between approximately 0% and 6% by weight of processing aids, between approximately 0% and 60% by weight of reinforcing materials and between approximately 0% and 15% by weight of protective materials, the compatibility of said coupling agent with both said thermoplastic and said adhesive polymer being greater than the compatibility of said thermoplastic with said adhesive polymer, said co-extrusion die having an outlet aperture therein having an elongated predetermined width extending in an X direction and a reduced height extending in a Y direction, said extrusion die having first, second and third inlet openings and first, second and third extrusion channels which extend from said first, second and third inlet openings, respectively toward said outlet aperture, said first, second and third extrusion channels merging in the interior of said die from positions wherein they are spaced in said Y direction to form a common outlet channel which opens outwardly through said outlet aperture, said outlet channel having a width which is substantially equal to said predetermined width at the point where said outlet channel opens outwardly through said outlet aperture, material from said first, second and third streams merging in the interior of said die so that the material from said second stream is interposed between the material from said first and third streams, material from said first, second and third streams passing outwardly through said outlet aperture as a continuous tape sheet of first, second and third intimately fused layers of material from said first, second and third streams, respectively.

3. In the method of claim 2, said extrusion die outlet aperture having a dimension of at least approximately 1 inch in the X direction and a dimension of between approximately 15 mils and 60 mils in the Y direction.

4. In the method of claim 2, said first, second and third extrusion channels having widths which are substantially equal to said predetermined width in the area where said first, second and third extrusion channels merge.

5. In the method of claim 1, the thermoplastic in said second stream further characterized as polyethylene.

6. In the method of claim 1, said elastomeric based adhesive polymer further characterized as being selected from a group consisting of EPDM, EPM and butyl elastomeric based adhesive polymers.

7. In the method of claim 6, said coupling agent further characterized as being selected from a group consisting of EPDM, EPM and butyl coupling agents.

8. In the method of claim 7, said coupling agent comprising said elastomeric based adhesive polymer.

9. The method of claim 1 further comprising the step of cooling said continuous tape sheet by passing it through a plurality of cooling rollers after it passes outwardly through said outlet aperture.

10. In the method of claim 1, said first, second and third streams being at temperatures of at least approximately 300° F. when they merge.

11. In the method of claim 1, said first pressurized stream further characterized as comprising between approximately 20% and 60% by weight of an elastomeric based adhesive polymer, between approximately 20% and 55% by weight of fillers, between approximately 8% and 40% by weight of tackifiers, between approximately 3% and 6% by weight of processing aids, between approximately 15% and 60% by weight of reinforcing materials, and between approximately 2% and 15% of protective materials, said third pressurized stream further characterized as comprising between approximately 80% and 100% by weight of a molten flexible thermoplastic.

12. In the method of claim 1, said first pressurized stream further characterized as comprising between approximately 20% and 60% by weight of an elastomeric based adhesive polymer, between approximately 20% and 55% by weight of fillers, between approximately 8% and 40% by weight of tackifiers, between approximately 3% and 6% by weight of processing aids, between approximately 15% and 60% by weight of reinforcing materials, and between approximately 2% and 15% of protective materials, said third pressurized stream further characterized as comprising a mixture comprising between approximately 20% and 60% by weight of an elastomeric based adhesive polymer, between approximately 20% and 55% by weight of fillers, between approximately 8 and 40% by weight of tackifiers, between approximately 3% and 6% by weight of processing aids, between approximately 15% and 60% by weight of reinforcing materials, and between approximately 2% and 15% of protective materials.

13. In the method of claim 11, said elastomerically compatible coupling agent comprising an approximately 50:50 mixture of material having substantially the same composition as said first pressurized stream and material having substantially the same composition as said third pressurized stream.

14. In the method of claim 12, said elastomerically compatible coupling agent comprising material having substantially the same composition as said first pressurized stream.

15. In the method of claim 11, said elastomerically compatible coupling agent comprising a mixture of material having substantially the same composition as said first pressurized stream and material having substantially the same composition as said third pressurized stream.

* * * * *